United States Patent
Borden, IV

(10) Patent No.: US 7,116,891 B2
(45) Date of Patent: Oct. 3, 2006

(54) FAST FORWARD AND SKIP REMOTE CONTROL

(75) Inventor: George R. Borden, IV, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 458 days.

(21) Appl. No.: 10/786,515

(22) Filed: Feb. 24, 2004

(65) Prior Publication Data

US 2005/0024545 A1    Feb. 3, 2005

Related U.S. Application Data

(60) Provisional application No. 60/535,190, filed on Jan. 6, 2004, provisional application No. 60/491,462, filed on Jul. 30, 2003.

(51) Int. Cl.
*H04N 5/91* (2006.01)
*H04N 7/00* (2006.01)

(52) U.S. Cl. ............................... 386/68; 386/69; 386/46

(58) Field of Classification Search ................. 386/46, 386/86, 68, 69, 66, 6, 7, 124, 125, 126; 348/14.05, 348/211.99, 734, 735; 379/102.01
See application file for complete search history.

(56) References Cited

U.S. PATENT DOCUMENTS

| | | |
|---|---|---|
| 5,701,383 A | 12/1997 | Russo et al. |
| D424,061 S | 5/2000 | Backs et al. |
| D424,577 S | 5/2000 | Backs et al. |
| D431,552 S | 10/2000 | Backs et al. |
| D433,403 S | 11/2000 | Backs et al. |
| D434,043 S | 11/2000 | Holland et al. |
| D435,561 S | 12/2000 | Pettigrew et al. |
| 6,215,526 B1 | 4/2001 | Barton et al. |
| 6,233,389 B1 | 5/2001 | Barton et al. |
| D445,801 S | 7/2001 | Ma |
| 6,310,886 B1 | 10/2001 | Barton |
| 6,327,418 B1 | 12/2001 | Barton |
| 6,385,739 B1 | 5/2002 | Barton et al. |
| D463,788 S | 10/2002 | Smith et al. |
| 6,487,646 B1 | 11/2002 | Adams et al. |
| 6,490,722 B1 | 12/2002 | Barton et al. |
| 6,535,253 B1 | 3/2003 | Barton et al. |
| 6,642,939 B1 | 11/2003 | Vallone et al. |
| 6,643,798 B1 | 11/2003 | Barton et al. |
| 6,728,713 B1 | 4/2004 | Beach et al. |
| 6,757,837 B1 | 6/2004 | Platt et al. |
| 6,757,906 B1 | 6/2004 | Look et al. |
| 6,792,195 B1 | 9/2004 | Barton |
| 2003/0227406 A1* | 12/2003 | Armstrong .................. 341/176 |
| 2004/0126085 A1* | 7/2004 | Braun et al. .................. 386/46 |

* cited by examiner

*Primary Examiner*—Robert Chevalier
(74) *Attorney, Agent, or Firm*—Chernoff, Vilhauer, McClung & Stenzel

(57) ABSTRACT

A remote control that includes multiple fast forward modes and a skip mode.

10 Claims, 2 Drawing Sheets

FAST FORWARD AND SKIP REMOTE CONTROL

This application claims the benefits of U.S. patent application Ser. No. 60/491,462 filed Jul. 30, 2003 and U.S. patent application Ser. No. 60/535,190 filed Jan. 6, 2004.

BACKGROUND OF THE INVENTION

The present invention relates to an interface for a video device.

Many users have large libraries of video tapes upon which is stored desirable video content. The user places the video tape within a video cassette recorder and presses the play button on the video cassette recorder or an associated remote control. The user then watches the video content. Normally while watching non-interesting portions of the video or otherwise in an attempt to search for particular content on the cassette the user may fast forward a portion of the video tape, such as double speed. Unfortunately, having merely a single fast forward speed results in some difficulty for the user to appropriately view the content as it passes by because it may be to fast or to slow for proper viewing. In addition, having merely a single fast forward speed results in some difficulty for the user to quickly move forward a substantial duration.

Another type of personal video recording device uses a digital recording medium, such as a recordable digital video disc or hard drive, to record video content. The personal video recorder is primarily used to record video broadcast or other available video content for viewing at a different time. Typical personal video recorders include a multitude of different buttons to fast forward, skip commercials, switch to recorded video watching mode, and switch to television watching mode. In order to activate each of these functions the user must examine his remote control and determine where the button is located for the particular function.

For example, a personal video recorder available from TiVO may include a single fast forward button that when depressed cycles from 2× speed, to 4× speed, to 8× speed, as the button continues to be depressed. The user may then release the button while at the desired fast forward speed to maintain that fast forward speed. In this manner the user may selectively speed through a portion of the video content. Typically the user examines the remote control to locate the fast forward button. Also, the user typically examines the remote control to locate the appropriate button to return to normal viewing.

The TiVO personal video recorder may also include a jump commercial button. The jump button typically skips forward ("fast forwards") in increments of approximately 30 seconds, which is the normal duration of a commercial. This is convenient for a user who does not like to watch commercials. Typically the user examines the remote control to locate the jump button. Also the user typically examines the remote control to locate the appropriate button to return to normal viewing.

DETAILED DESCRIPTION OF THE PREFERRED EMBODIMENT

A single button on the remote control would be useful to achieve the fast forward features, the skip feature, and the return to typical viewing. This would provide easier control for the user and alleviate the need to search for various buttons on the remote control.

Figure 1:
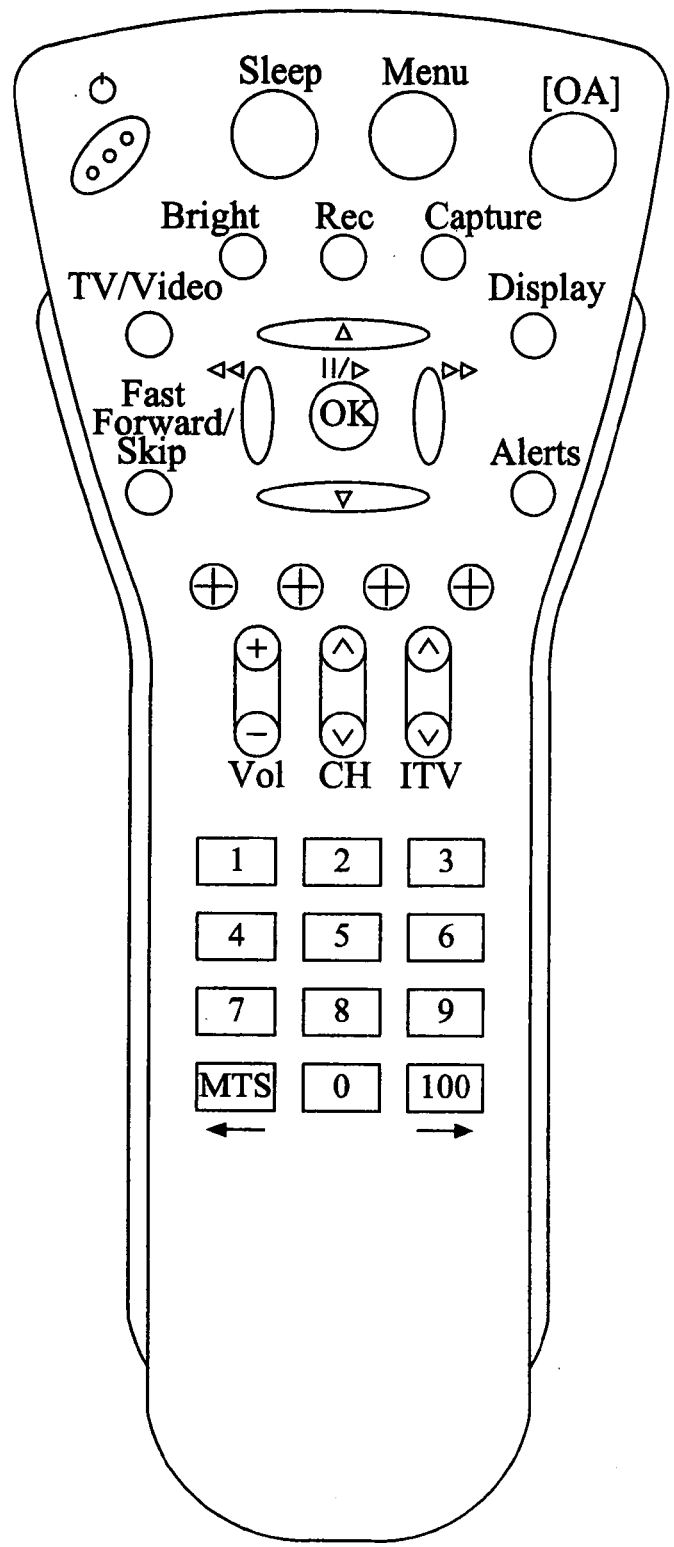
FIG. 1 illustrates a remote control with a fast forward and skip button.
Figure 2:
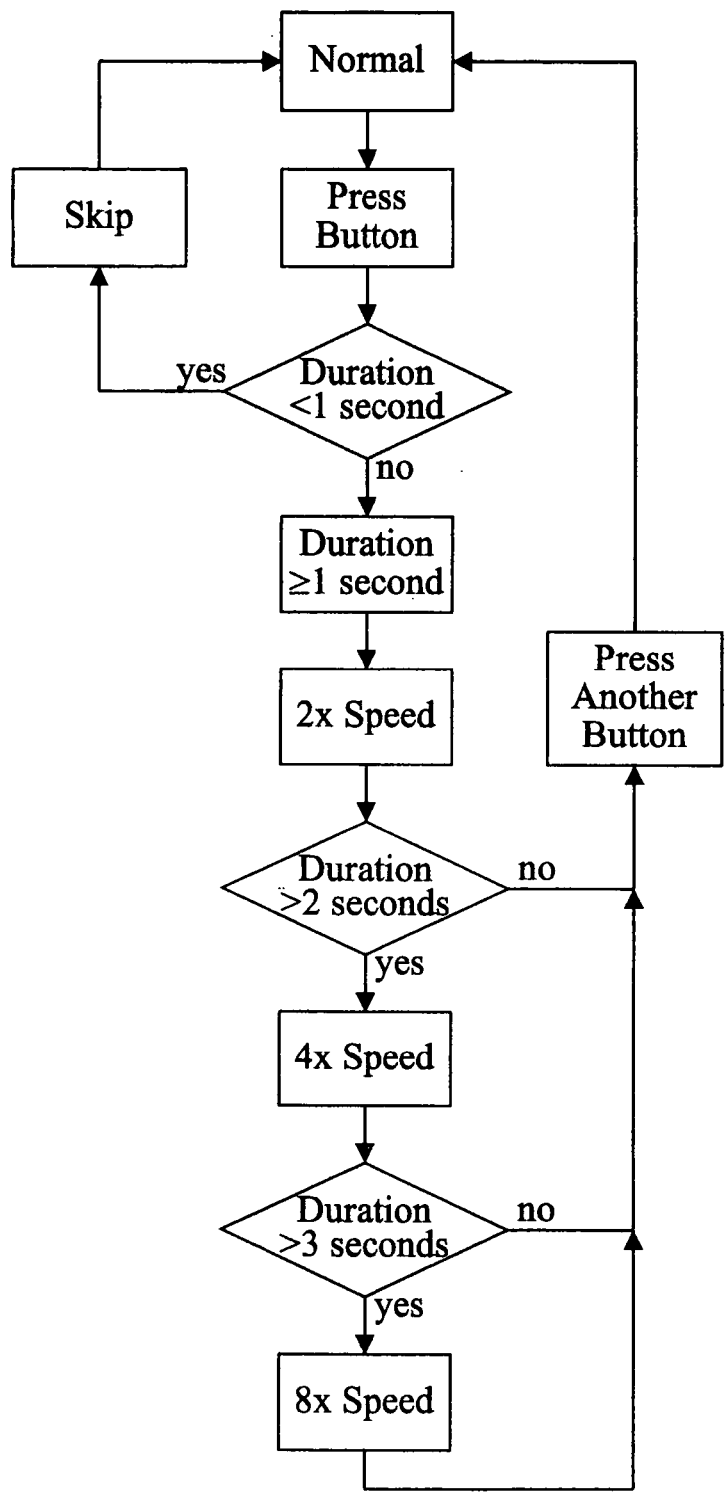
FIG. 2 illustrates a fast forward and skip function.

It has been determined that typical users of personal video recorders frequently desire to scroll through a video clip, or otherwise video content, at an increasing fast rate as the video is being fast forwarded through. Referring to FIG. 1, to facilitate this fast forwarding feature a single button may be provided on a remote control that has a multi-speed feature selectable by the duration that the button is pressed.

Pressing and holding the single button for a sufficient period of time, such as 1 second or more, results in the personal video recorder fast forwarding at a rate of 2×.

Continuing to press and hold the single button for an additional sufficient period of time, such as another second or more, results in the personal video recorder fast forwarding at a rate of 4×.

Continuing to press and hold the single button for an additional sufficient period of time, such as another second or more, results in the personal video recorder fast forwarding at a rate of 8×.

Continuing to press and hold the single button for an additional sufficient period of time, such as another second or more, results in the personal video recorder returning to standard 1× playback.

In order to maintain the fast forwarding of the video content at the desired speed, the button may be released at any time during the current fast forward speed selection. For example, releasing the fast forward button while the fast forward mode is in 4× mode results in the continuation of 4× mode. Other speeds and durations may likewise be used, as desired.

Pressing any other button returns the playback to the normal rate, such as 1× mode. Also, pressing the fast forward button for a limited duration may likewise return the playback to the normal rate. As it may be observed, the use of a single fast forward button on the remote control permits the user to effectively achieve different fast forward rates, while still permitting the return to normal replay rates.

There are times that the user does not wish to fast forward through a portion of the video content, such as a video commercial, but would rather simply just skip the content all together. In this case the user typically prefers to skip the commercial. However, in many cases the user would prefer to simply use the same button as the fast forward feature rather than have to learn the position of or otherwise fuss with additional buttons on a remote control. Also, if the user has to locate the skip button, which may take 2–3 seconds, then the skip of an additional 30 seconds may result in missing a portion of the continuing program.

To simplify this inconvenience associated with multiple buttons on a remote control the same button may be used for both fast forwarding and skipping a portion of the video content. Normally the skip feature is something that is desirable to occur within a short duration and therefore should be a quick feature to select using the fast forward button on the remote control. Accordingly, if the user presses the single button for a sufficiently short duration, such as less than 1 second, then the system will skip ahead 30 seconds (or other duration). The skip ahead feature may also be based upon vide content, if desired.

The combination of the fast forward feature and the skip ahead feature using a single button on the remote control provides the functionality desired by the user in a simple and intuitive manner.

The invention claimed is:

1. A remote control with a button comprising:
   (a) said button operatively interconnected to a video device;
   (b) operating said button for a first duration less than a first threshold duration resulting in skipping a portion of a video of said video device;
   (c) operating said button for a second duration less than a second threshold duration resulting in fast forwarding said video at a first rate;
   (d) operating said button for a third duration less than a third threshold duration resulting in fast forwarding said video at a second rate, wherein said second rate is faster than said first rate, wherein said first rate and said second rate is greater than a normal playback rate for said video device.

2. The remote control of claim 1 wherein said button is operated by pushing.

3. The remote control of claim 1 wherein said video device is a personal video recorder.

4. The remote control of claim 1 wherein said first threshold duration is less than said second threshold duration.

5. The remote control of claim 4 wherein said second threshold duration is less than said third threshold duration.

6. The remote control of claim 1 wherein releasing said button after said first threshold duration results in fast forwarding said video at said first rate.

7. The remote control of claim 1 wherein releasing said button after said second threshold duration results in fast forwarding said video at said second rate.

8. The remote control of claim 1 wherein releasing said button after said third threshold duration results in fast forwarding said video at a rate greater than said second rate.

9. The remote control of claim 1 wherein pressing another button results in changing to said normal playback rate.

10. A remote control with a button comprising:
    (a) said button operatively interconnected to a video device;
    (b) operating said button for a first duration less than a first threshold duration resulting in skipping a portion of a video of said video device and thereafter changing to a normal playback rate for said video device;
    (c) operating said button for a second duration greater than said first threshold duration and less than a second threshold duration resulting in fast forwarding said video at a first rate, wherein said first rate is greater than said normal playback rate;
    (d) operating said button for a third duration greater than said second duration and less than a third threshold duration resulting in fast forwarding said video at a second rate, wherein said second rate is greater than said first rate;
    (e) operating said button for a fourth duration greater than said third duration resulting in fast forwarding said video at a third rate, wherein said third rate is greater than said second rate;
    (f) pressing another button of said remote control returning said video device to said normal playback rate.

* * * * *